United States Patent [19]

Tabata

[11] 4,175,901
[45] Nov. 27, 1979

[54] AUTOMATIC COMMODITY STORING APPARATUS

[75] Inventor: Yoichi Tabata, Osaka, Japan

[73] Assignee: Itoki Kosakusho Co., Ltd., Osaka, Japan

[21] Appl. No.: 865,691

[22] Filed: Dec. 29, 1977

[30] Foreign Application Priority Data

Dec. 29, 1976 [JP] Japan .................................. 51/159640

[51] Int. Cl.² .............................................. B65G 1/02
[52] U.S. Cl. ................................................... 414/282
[58] Field of Search .......... 214/16 B, 16.4 R, 16.4 A, 214/16.4 C; 414/277, 282

[56] References Cited

U.S. PATENT DOCUMENTS 3,176,279  3/1965  Lin et al. ...................... 214/16 B X
3,732,742  5/1973  Castaldi ................................. 214/16

Primary Examiner—Robert G. Sheridan
Attorney, Agent, or Firm—Hopgood, Calimafde, Kalil, Blaustein & Lieberman

[57] ABSTRACT

Apparatus for the storage of commodities which includes a plurality of shelves arranged to provide storage positions in the vertical and horizontal direction and a commodity carriage, containing a commodity to be stored, designed to move up and down and left and right along a front face of the shelves. The commodity carriage is positioned at a point facing a predetermined storage location in the shelves and apparatus "pushes-aside" the commodities contained in adjacent storage location so that the commodity contained on the carriage can be stored without interference.

5 Claims, 12 Drawing Figures

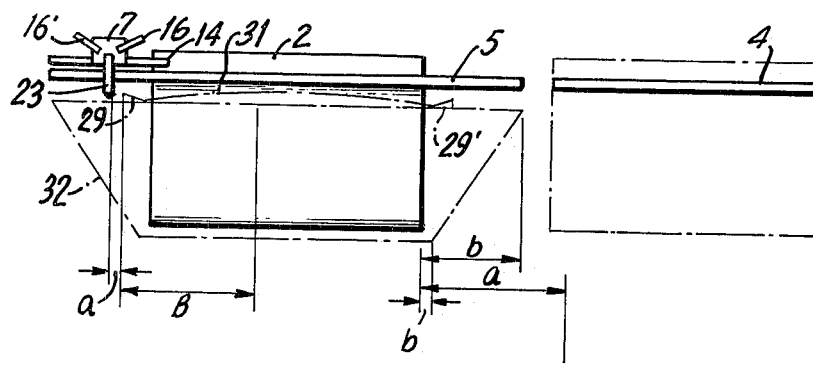
FIG.8(a)
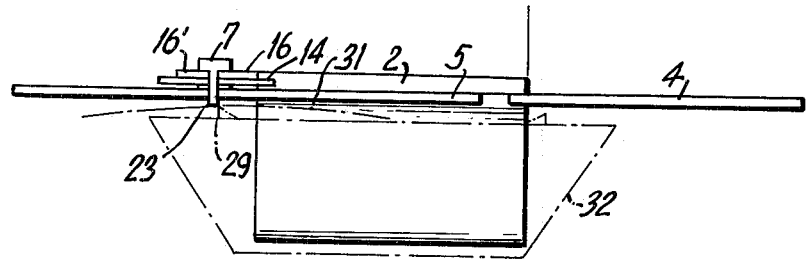
FIG.8(b)
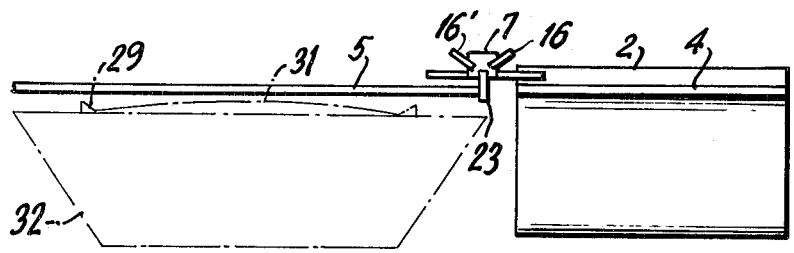
FIG.8(c)
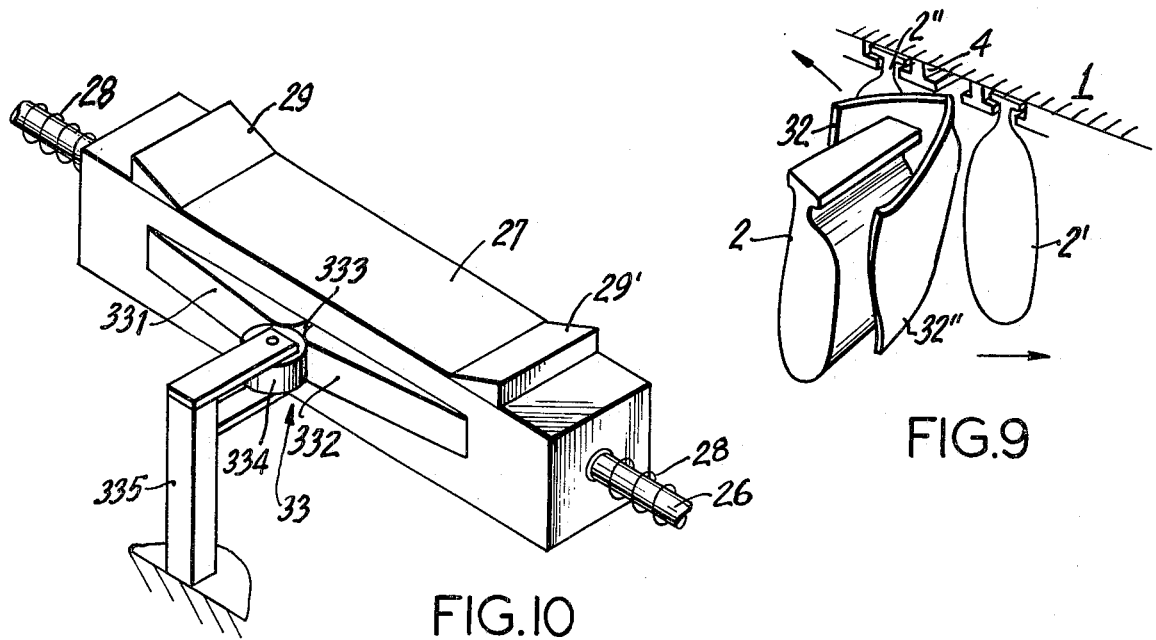
FIG.10
FIG.9

AUTOMATIC COMMODITY STORING APPARATUS

FIELD OF THE INVENTION

This invention relates to the storage of articles and more particularly to an automated storage system for use in an automated warehouse.

DESCRIPTION OF THE PRIOR ART

Known apparatus exists for the automatic storage of commodities in storage shelves and for the automatic retrieval of commodities from storage shelves. Such apparatus, is shown in U.S. Pat. No. 3,526,326, and in general, consists of shelves, having commodity storage positions arranged vertically and horizontally, a commodity carriage, designed to move up and down, and left and right, along the front face of the shelves, commodity transfering apparatus to transfer commodities between the carriage and the storage positions, and a control circuit, to control the operation of the carriage and the transfering apparatus. A disadvantage of this prior art system is that when storing an article in a designated storage position, the designated storage space must be completely empty. Due to this requirement, the commodity being stored must be restricted to a certain volume and form, or a special support method or partitition must be utilized to prevent the commodity from jutting out into adjoining storage spaces. The result of these restrictions is that the storage density decreases, and, therefore, it becomes uneconomical to store large quantities of commodities as the volume of the storage apparatus becomes very large.

It is, therefore, an object of this invention to provide apparatus for the automatic storage of commodities which has high storage density while at the same time the apparatus prevents interference of the stored commodity with articles in adjoining storage spaces.

SUMMARY OF THE INVENTION

The automatic storage apparatus of the instant invention comprises a plurality of shelves, arranged to provide commodity storage positions in the vertical and horizontal direction, a commodity carriage, designed to move up and down and left and right along the front face of the shelves, commodity storage apparatus to store the commodities contained in the commodity carriage, in the shelf storage positions, a first control method to control the operation of the commodity carriage in order to stop the commodity carriage at a position facing the designated storing position, and a second control method to operate the commodity storage apparatus when the commodity carriage is topped at the designated storage position.

It is a feature of the invention that the automatic commodity storage apparatus includes push-away apparatus for pushing away, from either side of the designated storage position, the articles stored adjacent to the designated storage position, with the designated storage position being defined as the storage position which the commodity carriage is facing.

It is a further feature of the invention that the control method is designed to operate the above-mentioned push away apparatus before the commodity on the commodity carriage is inserted into the designated storage position by commodity transfer apparatus.

The foregoing and other objects and features of this invention will be more fully understood from the following description of an illustrative embodiment thereof taken in conjunction with the accompanying drawings.

BRIEF DESCRIPTION OF THE DRAWINGS

FIG. 8(a) shows the commodity on the carriage to be inserted on the shelf or after retrieval from the shelf, FIG. 8(b) shows the commodity being inserted into the shelf from the carriage, FIG. 8(c) shows the commodity on the shelf either before retrieval or after insertion, FIG. 9 Top view showing the relation between the shelf and shaped part when storing, and the movable block's FIG. 10 Top view showing the movable block's vibration control appratus.

DETAILED DESCRIPTION

Figure 1:
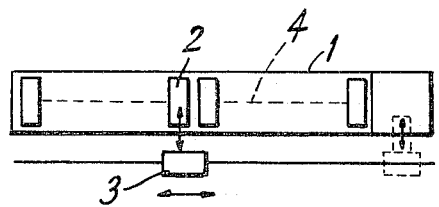
FIG. 1 Upper view showing simplified construction of automatic commodity retrieval and storage apparatus, FIGS. 2&3 Partial front view of shelf, with a different commodity storage method, FIG. 4 Partial cross-sectioned side view of shelf and carriage of one embodiment of the invention, FIG. 5 Upper view of main part of carriage, FIG. 6 Cross-section drawing of A—A in FIG. 5, FIG. 7 Shaped part seen from one side of the shelf.

Hereinafter, the invention is explained in details, with reference to the drawings. FIG. 1 shows a simplified construction of the commodity automatic retrieval and storage apparatus. In order to accomplish the retrieval and/or storage of a commodity 2 into the storage spaces arranged in shelf 1, a commodity transfer carriage 3 is designed to move along the front face of the shelf. The commodity transfer carriage transfers commodities between the carriage and the designated storage position and between the carriage and the commodity retrieval section 4 of this apparatus, as will be detailed hereinafter.

Figure 2:
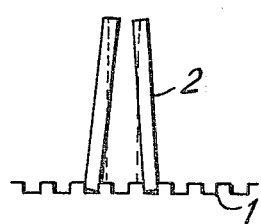
Figure 3:
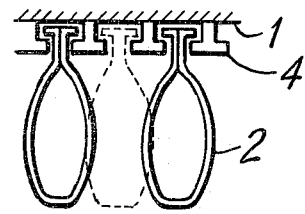

The apparatus to transfer a commodity between a storage position and the carriage, is installed on the shelf, or alternatively, is installed on the commodity transfer carriage itself. In the case of the later alternative, the operation required to remove a commodity from the carriage or to put a commodity on the carriage, at the retrieval section, can be accomplished automatically. However, with such an automatic operation, it is desirable to lower the occupied volume of the shelf and to reduce the commodity storage space. In the case where a partition is not installed between adjoining storage spaces, i.e., like FIG. 2, or in the case where a commodity is much smaller in width at the lower portion than it's height, then even though the commodity is supported by a U groove on the shelf surface, the commodity may tilt and partly intrude into adjoining empty spaces. In this instance, if an attempt is made to transfer a commodity from the carriage to an empty position, the commodity intruding into an adjoining space will interfere and prevent a storage operation. Consequently, the result may be breakage of the commodity, and/or the storage apparatus. The same problems may occur, as shown in FIG. 3, when file folder 2 (hereinafter called folder) is made of a soft material such as plastic. When such a folder is hung and stored and the files in the folder increase, the folder will begin to intrude on adjoining spaces. This invention is designed to provide apparatus for automatically storing commodities to the exact designated storage position, even when adjacent files may intrude into the storage space.

Figure 4:
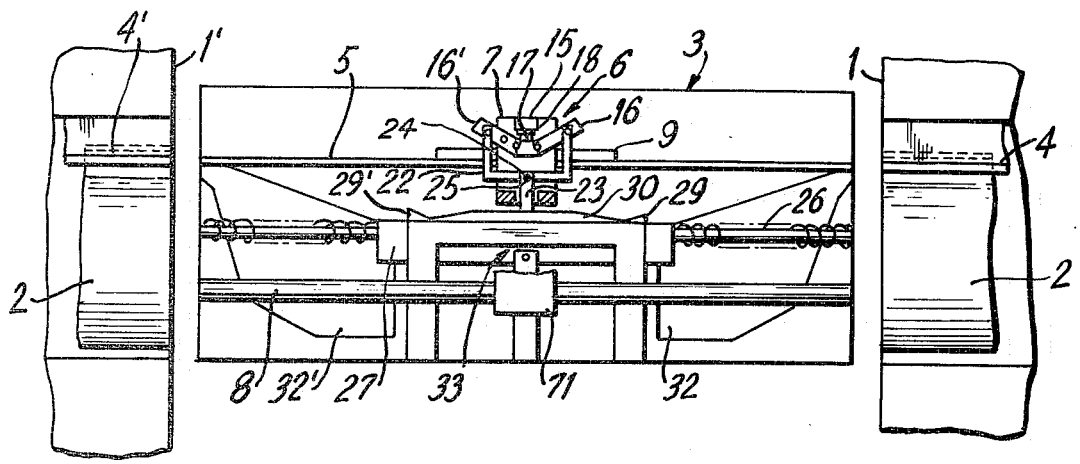
Figure 5:
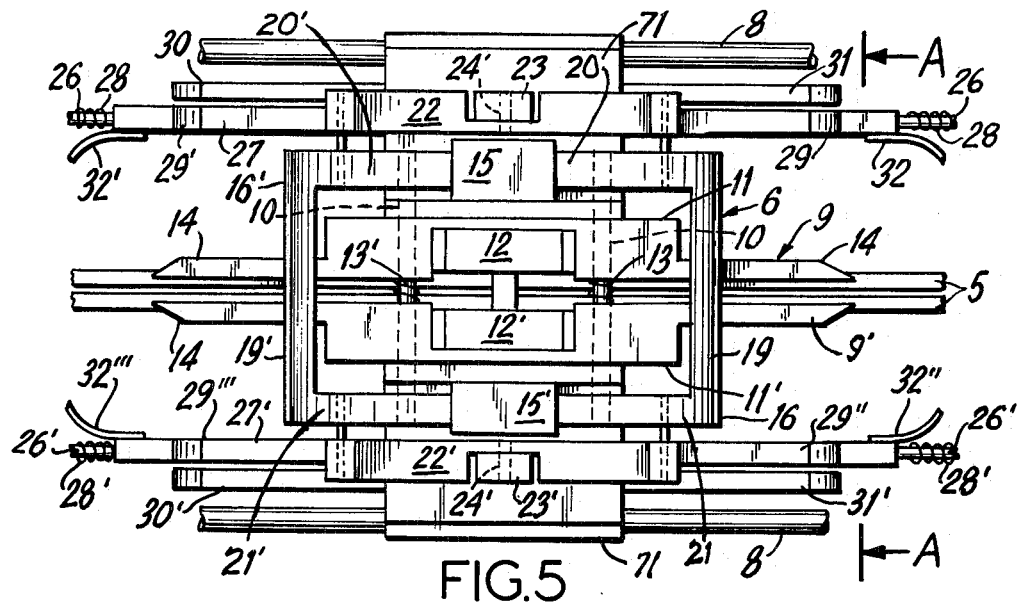
Figure 6:
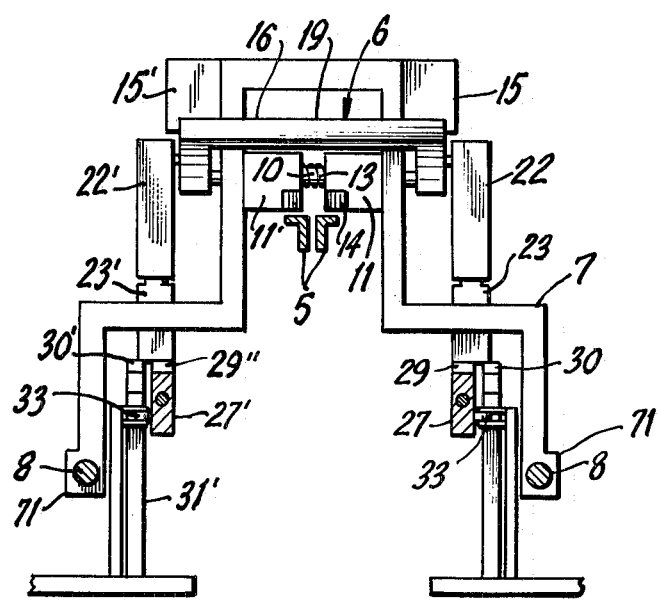

Hereinafter, a working example of this invention will be described in detail. FIGS. 4–6 illustrate a working example of storing and retrieving a folder from a shelf to the carriage and from the carriage to a shelf by apparatus installed on the carriage, when a folder is stored by hanging the folder on the shelf as shown in FIG. 3. Referring to FIGS. 4–6, shelf 1 and 1' are installed to face each other and have therebetween carriage 3 which moves along the shelves. Shelves 1 and 1' are divided into a plurality of vertical levels, and the ceiling of each level has rails 4 and 4' to support a folder by hanging. A position address code is given to each position and a level address code is given to each level. A designated folder storage position is defined by these two codes.

On carriage 3, rail 5 (to hang folder 2) is installed to extend to both facing sides of shelves 1 and 1'. A system to control the position of the carriage so as to face one end of rail 5 against the designated storage position's rail in the shelf is not detailed herein as any known method can be adopted. For instance, as shown in U.S. Pat. No. 3,526,326, a method utilizing address code marks and the detection of these marks to control the operation of the carriage is illustrated. An alternative method is to measure the distance the carriage moves. Other alternative methods can also be adopted.

Carriage 3 also has folder retrieval and storage apparatus 6 which retrieves folder 2 from a shelf and moves the folder on to a shelf. Folder retrieval and storage apparatus 6 includes frame body 7, which is fork-shaped straddles rail 5, and for 71, both ends of which are supported on two guide shafts 8, designed to extend to both sides of the carriage facing the shelves. Fork 71 moves along these guide rails to the left and right. In order to move frame body 7, apparatus is required to achieve straight line movement transformed from the rotary movement of a motor. A pully or chain could be used but these devices are omitted from the drawing as they are well-known. Folder supporter 9 is installed in frame body 7, directly above rail 5. This folder supporter includes two movable parts, 11 and 11', which slide along two fixed shafts 10 and 10' extended between the opposite faces of fork-shaped frame body 7, solenoids 12 and 12' fixed to each movable part, springs 13 and 13' designed to apply pressure to each fixed part in order to separate the fixed parts along fixed shafts 10 and 10'.

Both ends of movable parts 11 and 11' are connected to an extended position of rail 5 and both ends stick out of frame body 7 and comprise a holding part which holds the upper end of a folder. Solenoids 15 and 15' are fixed on the outside of the opposed walls of frame body 7, ]-shaped parts 16 and 16' are pivotally supported and both ends of each ]-shaped part are connected to plunger 17 of solenoids 15 and 15'. Plunger 17 is normally pressed downward by spring 18, and consequently, ]-shaped parts 16 and 16' are normally turned to place each connecting section 19 and 19' at an upper position. When solenoids 15 and 15' operate, ]-shaped parts 16 and 16' are turned downward. Arms 20 and 20', 21 and 21', which are installed on the same side of frame body 7 as that of ]-shaped parts 16 and 16', are connected and supported respectively by U-shaped parts 22 and 22'. Sliding pivots 23 and 23' are hung at the U-shaped bottom of U-shaped parts 22 and 22'. That is, as the drawing shows, pins 24 and 24' installed at the bottom of the U-shape are inserted into elongated slot 25 made on each sliding pivot 23 and 23'. Consequently, sliding pivots 23 and 23' are able to move up and down for the length of slot 25. At the opposite position, against the bottom face of each sliding pivot 23 and 23', movable blocks 27 and 27' are installed. The blocks are designed to slide on shaft 26 and 26' and are fixed and supported on the outside frame of the carriage in the same extended direction as rail 5. Movable blocks 27 and 27' are held and supported by springs 28 and 28', from both sides, to place the blocks at the center of shafts 26 and 26'. On the upper face of movable blocks 27 and 27', near both ends thereof, pivots 29, 29', 29'', 29''' are designed to meet the lower end of sliding pivots 23 and 23' when they are pushed down by the above-mentioned solenoids 15 and 15'. Similarly, sliding pivot guide blocks 30 and 30' are fixed and arranged parallel with movable blocks 27 and 27'.

The upper face of the sliding pivot guide block is slanted downward on both sides and is flat in the middle. The height of the flat face 31 and 31' is arranged to be the same or greater than the height of pivot 29—29''' on movable blocks 27 and 27'. The position or flat face 31 and 31' are, in the long direction of rail 5, placed between pivots 29—29' and 29''—29''' when the above-mentioned movable blocks 27 and 27' are placed in the center of shaft 26 and 26'. Shaped parts 32—32'' are connected to each of movable blocks 27 and 27', and designed to stick out on both sides as they extend from the movable block and approach rail 5. Each shaped part 32—32'' are, as shown in FIG. 4, arranged with a vertical face and constructed like a pointed feather. Therefore, when seen from the side of the carriage, facing the shelf as in FIG. 7, the shaped parts 32—32'' (or 32'—32'') at both sides of rail 5, appear as a bow seen from the front. But, as the drawing indicates, both shaped parts are separated by rail 5.

Hereinafter, the operation of the folder retrieval and storage apparatus will be explained. When carriage 3 is placed at the designated storage position by any known method, the motor (not shown) operates and frame body 7 will move toward the opposing shelf. When frame body 7 has moved to the far end of carriage 3, it is stopped (by a limit switch, for example), and at the same time, solenoids 12 and 12' are operated. Thus, movable parts 9 and 9' will move closer against springs 13 and 13'. At this moment, the edge of movable parts 9 and 9' are positioned at both sides of folder 2's head, which is supported by rail 4 at the designated storage position. Moveable parts 9 and 9' will hold the head of folder 2, by holding section 14 thereof, and thus will support the folder. When this holding operation is completed and detected by a limit switch for instance, the drive motor again operates and moves frame body 7 to the opposite side of the carriage. The motor is then stopped, and solenoids 12 and 12' are released. With this operation, the designated folder 2 is moved onto rail 5, on carriage 3, and supported by the rail. Therefore, the operation to retrieve a folder 2 from the shelf and to move it onto the carriage is completed. This situation is shown in FIG. 8(a) as a simplified drawing. In addition, when movable parts 11 and 11' move closer due to the operation of solenoids 12 and 12', the movable parts become a unit and move on fixed shafts 10 and 10'. The movable parts, when holding a folder by holding section 14, are movable accurately to face against the folder. Similarly, if the folder is made of a soft material and even if there are some aberration between rail 5 and rail 4, the rails are constructed with a pointed top so that it becomes possible to retrieve a folder from rail 4 to rail 5.

An explanation will now be given concerning the operation of moving folder 2, contained on carriage 3, into the shelves, by reference to the simplified drawing of FIG. 8. From the condition shown in FIG. 8(a), wherein the folder is shown stored on rail 4 in the shelf, solenoids 15 and 15' (FIG. 4–FIG. 6) will be operated, and then the motor to move the frame body will be operated. With the operation of solenoids 15 and 15', plunger 17 will be pulled up against spring 18, consequently, ]-shaped parts 16 and 16' will turn and move downwards, and connecting section 19 (or 19') will face the end of folder 2. Similarly, U-shaped parts 22 and 22', and consequently, sliding pivots 23 and 23' will also turn downward. With the movement of frame body 7, folder 2 will be pushed out to the shelf by the ]-shaped part 16, and at the same time, sliding pivots 23 and 23' will connect to pivot 29 of movable block 27 and push the movable block to the shelf. Therefore, as shaped part 32 moves toward the shelf and moves into the designated storage position, the folders located in adjoining storage positions will be pushed aside, and the insertion of folder 2 into the designated storage position will not be interfered with. This condition is shown in FIG. 8(b).

Referring to FIG. 8(b), when folder 2 moves partially onto rail 4 in the shelf, sliding pivots 23 and 23' will move onto flat face 31 of the sliding pivot guide block (30 and 30' in FIGS. 4–6) and the connection between the slide pivot and the pivot of the movable block will be released. Therefore, the movable block i.e., shaped part 32 will be returned to it's former position by springs 26 and 26'. (FIGS. 4–6) Thereafter, frame body 7 will continue to move to the end of carriage 3 and will transfer folder 2 completely onto rail 4 in the shelf. The frame body 7 is then stopped and solenoids 15 and 15' are released. This is shown in FIG. 8(c). Next the motor will reverse and the frame body will be returned to the center position of the carriage. At this moment, sliding pivots 23 and 23' are in a "pulled-up" state and they will not again move the movable block and shaped part 32. Also holding section 14 is not in a holding condition so that folder 2 will not be again pulled out to the carriage.

The total distance A, i.e., the distance from pivot 29 to sliding pivot 23 before folder 2 is stored in the shelf in FIG. 8(a), plus the distance B, i.e., the distance from pivot 29 to flat face 31, must be equal to the distance "a" which is the distance the top of the folder travels from the very beginning of the storage operation until insertion into the designated storage position. The distance B must be shorter than the distance "b" which is the distance between the top of rail 5 and the top of the folder before the storage operation. Furthermore, it is preferred to position both ends of the folder slightly back from the lower part of the shaped part (as shown in the drawing by b') when the folder is supported on the carriage. This should satisfy the relationship b' B. The result is that the whole folder is inserted with the push-aside method, and the storage operation will be accurately done.

Figure 7:
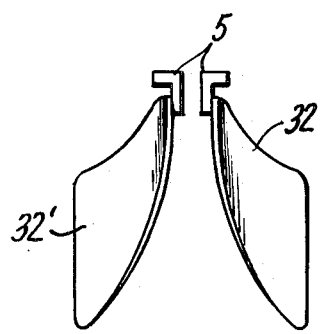

With above-mentioned working examples, the retrieval and storage of folder 2 from and to a shelf is accurately done. Especially when storing, be the push-aside method utilized shape, a wedge namely shaped parts 32 and 32" (or 32' and 32") to precede the folder into the storage position, as shown in FIG. 9. This serves to push-aside adjoining folders 2' and 2" so that the storage of folder 2 will not be interfered with. In addition, shaped parts 32—32" have elasticity and when they are moved onto a shelf from rail 5, they are in an opened condition by rail 5, as shown in FIG. 7. Therefore, the tops will touch each other and, it becomes possible to go directly underneath and between rail 4 in the shelf.

With the foregoing storage operation, when sliding pivots 23 and 23' move onto flat face 31, movable blocks 27 and 27' and shaped parts 32—32" will return to the center position. This may result in vibration caused by springs 28 and 28' so a vibration control system (FIG. 4 and FIG. 6 MO 33) is recommended. More particularly, referring to FIG. 10, two mountain-shaped projection parts 331 and 332 project from the side (can be the lower side) of movable block 27 (27'). The parts 331 and 332 are parallel with the direction of shaft 26. The bottom section 333, of both projection parts, is positioned in the center of movable block 27 and both projection parts are symmetrically shaped in regard to this bottom section. Similarly, at the opposing position, against the center position of shaft 26 roller 334 is fixed. Roller 334 is supported by supporting board 335 so that the tops of projection parts 331 and 332 elastically touch the roller surface. Consequently, roller 334 rotates with the movement of movable block 27 and elastically touches the top face of the projection parts. Therefore, during the above-mentioned storage operation when the movable block is moved once and returned to the central position, with the release of the connection between pivot 29 and sliding pivot 23, the roller 334 will pressed into the bottom 333 of the projection parts and the above-mentioned vibration will be controlled.

As explained above, the interference against storage operations, caused by the tilt or slant of a commodity stored in an adjoining storage position is prevented, exact storage can be accomplished and storage density is increased. In addition, utilizing the push-aside method of the instant invention, many method can be used for the push-aside operation, such as air blowing, magnetizing, rotary brush, etc., and many designs and modifications can be developed for the inserting method or push-aside method. Moreover, for the operation of these push-aside methods, the storage method can be done mechanically, by installing an electrical control circuit to perform a planned program operation. Although a specific embodiment of this invention has been shown and described, it will be understood that various modifications may be made without departing from the spirit of this invention.

I claim:

1. Automatic apparatus for the storage of commodities, comprising, a plurality of shelves arranged to provide storage positions in the vertical and horizontal direction, a commodity carriage containing a commodity to be stored, and arranged, to move up and down and left and right along a front face of said shelves, means to position said commodity carriage at a point facing a predetermined storage position in the shelves, means for insertion and retrieval of said commodity, said insertion and retrieval means being slidably displaceable, and means operationally coupled to said insertion and retrieval means for slidable displacement therewith for pushing aside adjacent ones of said commodity to facilitate retrieval and insertion of said commodity into said predetermined storage position.

2. Apparatus in accordance with claim 1 wherein said pushing-aside means includes a wedge-shaped piece and means for inserting the wedge-shaped piece into the designated storage position prior to the time the commodity contained in the commodity carriage in inserted into the predetermined storage position.

3. Apparatus in accordance with claim 2 wherein the stored commodity is contained within a folder, said folder being supported by an overhead rail within the predetermined storage position.

4. Apparatus in accordance with claim 3 wherein each storage position is identified by a position address code and a level address code.

5. Apparatus in accordance with claim 4 wherein there is further included spring means for returning the inserting means to a starting position subsequent to the insertion operation and means for controlling vibrations resulting from the operation of said returning means.

* * * * *